(No Model.) 2 Sheets—Sheet 1.
J. J. MOORE.
STRAW STACKER.
No. 262,814. Patented Aug. 15, 1882.
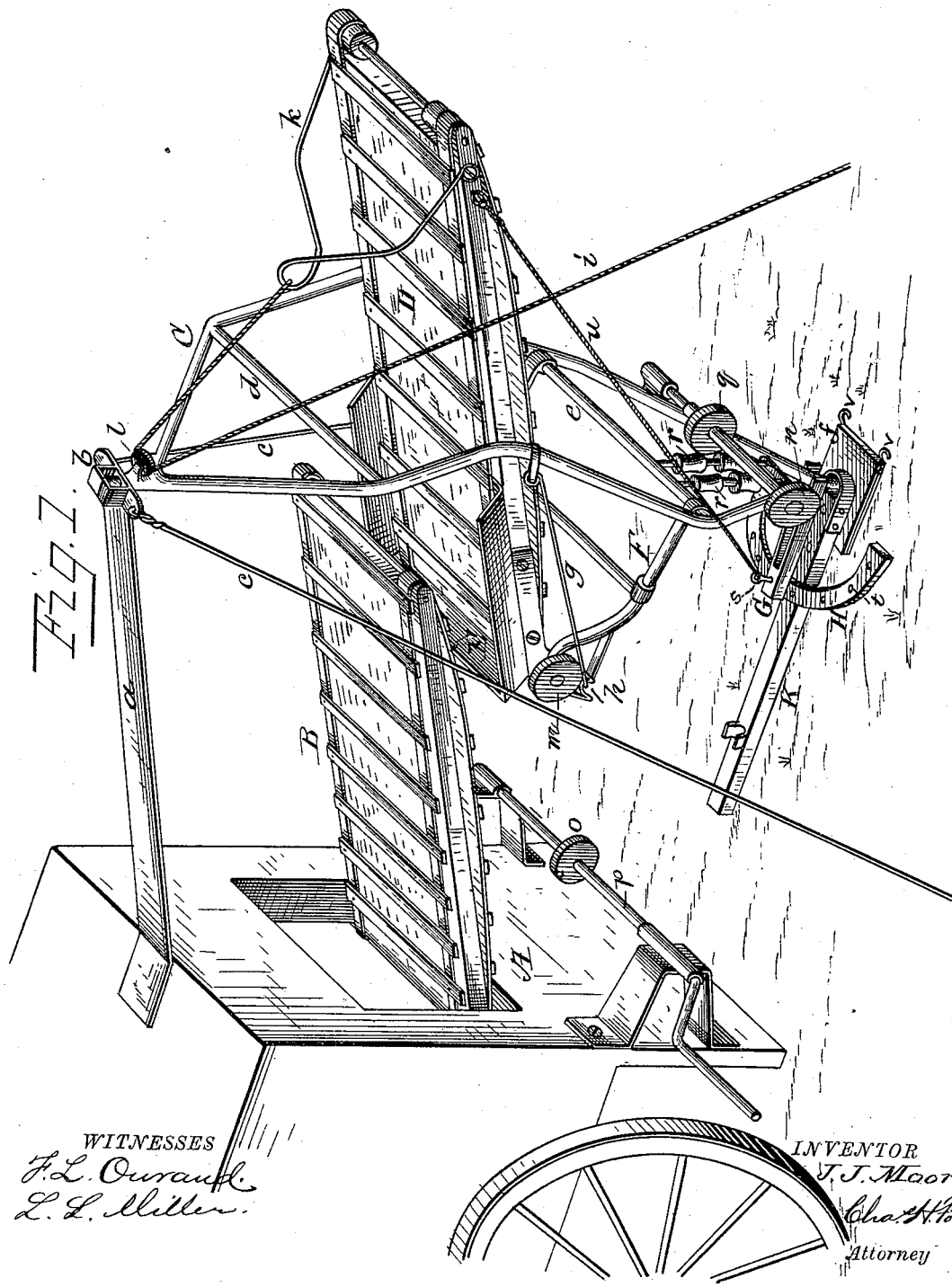
WITNESSES
F. L. Ourand
L. L. Miller
INVENTOR
J. J. Moore
Chas. H. Fowler
Attorney (No Model.) 2 Sheets—Sheet 2.
J. J. MOORE.
STRAW STACKER.
No. 262,814. Patented Aug. 15, 1882.
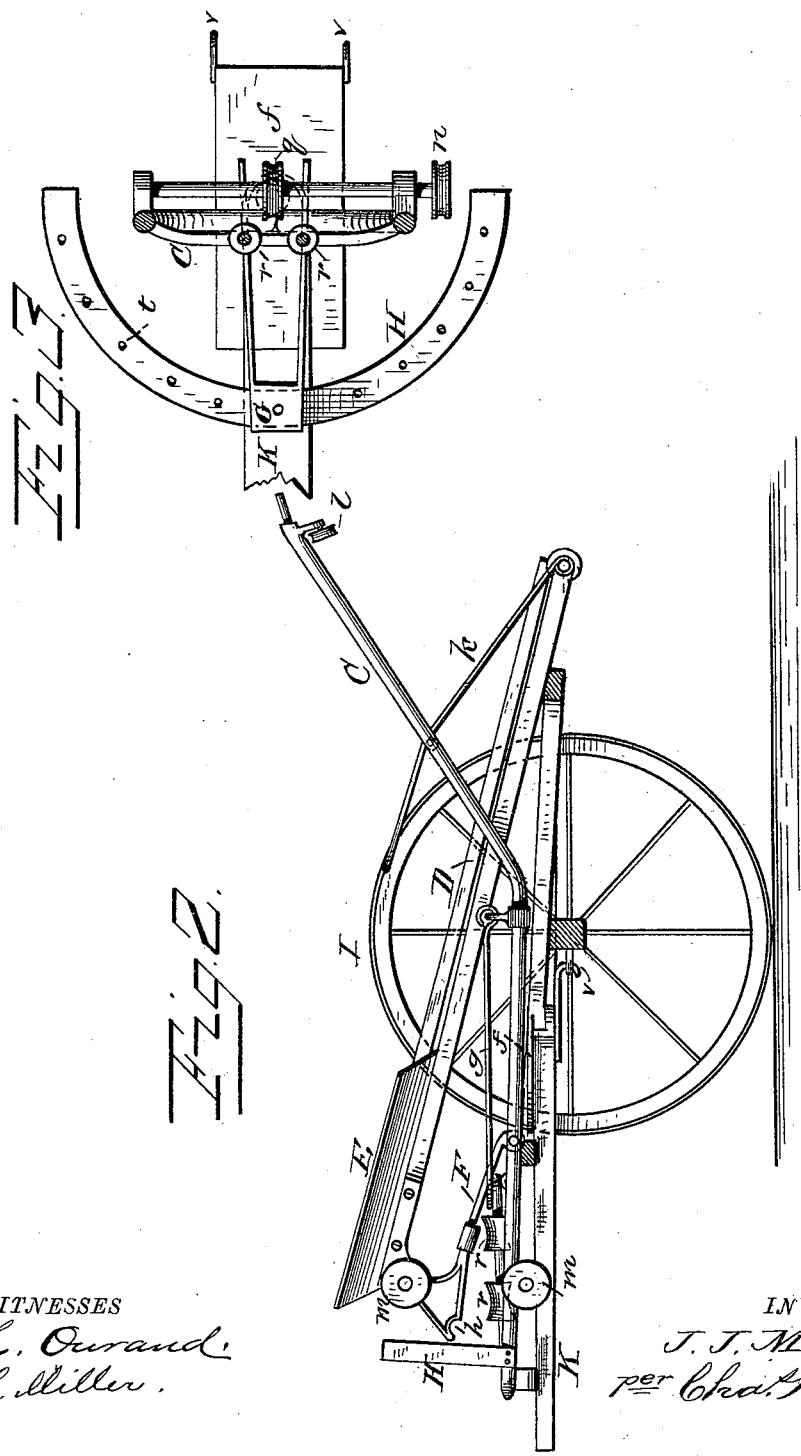
WITNESSES
F. L. Ourand.
L. L. Miller.
INVENTOR
J. J. Moore.
per Chas. H. Fowler
Attorney

UNITED STATES PATENT OFFICE.

JONATHAN J. MOORE, OF THORNTOWN, INDIANA.

STRAW-STACKER.

SPECIFICATION forming part of Letters Patent No. 262,814, dated August 15, 1882.

Application filed March 22, 1882. (No model.)

*To all whom it may concern:*

Be it known that I, JONATHAN J. MOORE, a citizen of the United States, residing at Thorntown, in the county of Boone and State of Indiana, have invented certain new and useful Improvements in Straw-Stackers; and I do hereby declare that the following is a full, clear, and exact description of the same, reference being had to the annexed drawings, making a part of this specification, and to the letters and figures of reference marked thereon.

Figure 1 of the drawings is a perspective view of the straw-stacker, showing it applied to the separator of a thrashing-machine. Fig. 2 is a side elevation of the stacker, showing it as folded up and placed upon the truck ready for moving; and Fig. 3 is a detail view, on an enlarged scale, of the lower end of the stacker.

The present invention has relation to certain new and useful improvements in that class of agricultural machines or devices adapted to receive the straw from the thrashing-machine and automatically build it into stacks. The object thereof is to improve and simplify the construction of the straw-stacker, and also render it capable of easy transportation from place to place where required for use, and of being readily set up and connected with the separator with comparatively little trouble. These objects I attain by the construction substantially as shown in the drawings and hereinafter described.

In the accompanying drawings, A represents the rear end of a separator of a thrashing-machine of the ordinary construction, with the usual straw-carrier, B.

To the separator A, at its top, is suitably connected a brace, $a$, of any desired length, having at its outer end a bearing-plate, $b$, of any desired form and construction, to receive the upper end of a pivoted frame or derrick, C.

To the end of the brace $a$, at each side, or to the bearing-plate $b$, as preferred, are attached the ends of guy-ropes $c$, the lower or opposite ends being connected to stakes driven into the ground.

The pivoted frame or derrick C is formed of metal, with cross-braces $d$ $e$, and is substantially of the shape shown in Fig. 1 to receive between its sides the straw-carrier D, which has at its rear end a hopper, E, to receive the straw from the carrier B, and thus prevent it from falling over the sides of the carrier D. The pivoted frame or derrick C, at its lower end, rests upon the plate $f$, which in turn rests upon the ground, said plate having a socket to receive the end of the pivoted frame or derrick and admit of its swinging upon its bearings at both top and bottom.

The carrier D, at its rear end, has pivotally connected to it a frame, F, said frame being pivoted or otherwise connected to the cross-brace $e$, so that it will swing thereon to admit of the frame being folded against the derrick when not in use. The frame F is held in an extended position, as shown in Fig. 1, by a bail, $g$, connected to the sides of the pivoted frame or derrick C, so that it can be swung out in position, the forward portion of the bail engaging with notches $h$ in the frame F. The forward end of the carrier D is held up by a rope, $i$, secured to a bail, $k$, or in any other manner connected to the carrier, said rope passing around a pulley, $l$, attached to the upper end of the frame or derrick, and fastened to any object in convenient proximity to the stacker. The carrier-belt upon the carrier D is operated by a suitable pulley, $m$, over which passes a driving-belt from the pulley $n$. A pulley, $o$, upon a shaft, $p$, suitably connected to the separator A, is caused to communicate motion to a pulley, $q$, through means of a belt passing over said pulleys and between vertical rollers $r$. By this arrangement of belts and pulleys motion is imparted to the belt of the carrier D, the shaft $p$ being driven by suitable gearing on the thrashing-machine.

To the lower end of the pivoted frame or derrick C is pivoted an arm, G, the outer end having secured thereto a stationary pin, $s$, which projects below the under side of the pivoted arm and enters one of a series of holes, $t$, in a segmental bar, H.

To the upper end of the pin $s$, or connected in any suitable manner to the arm G, is a rope, $u$, for raising the arm to disengage it with the segmental bar when required to change the position of the frame or derrick.

I do not desire to be understood as confining myself to the precise construction shown, as any suitable means may be employed of locking the arm G to the segmental bar H.

When the stacker is not in use and is required to be transported to another place of operation the rope $i$ is loosened from its fastening, and the outer or forward end of the carrier D is let down on a suitable truck, I, constructed for the purpose. As the carrier D is thus lowered the under side thereof strikes the cross-brace $e$ of the frame or derrick, and in so doing disengages the bail $g$ with the notches $h$ of the frame F, after which the pivoted frame or derrick C is disengaged at its top and bottom from its bearings and laid over on the truck, thereby enabling the stacker to be put in a compact and convenient form for transportation, as shown in Fig. 2.

The bearing-plate $f$ is bolted or otherwise secured to a suitable tongue, K; and after the stacker has been removed and placed upon the truck the hooks $v$ upon the plate $f$ are engaged with staples $w$ on the axle of the truck, and the tongue attached in any convenient manner to the separator and taken where desired.

The carrier D, if preferred, may be made in sections, hinged or otherwise suitably connected together, so that they may be folded up for convenience in handling.

It should be understood that the pivoted frame or derrick C may be swung around a complete semicircle, either to the right or left, and thus bring the carrier D at right angles to the position shown in Fig. 1, and is held in such position or any position in the arc of a circle by the arm G engaging with the segmental bar H.

The purpose of the rope $u$ is to provide means by which the arm G can be disengaged from the bar H by the person on the straw-pile. The rope, however, may be dispensed with when it is preferred to operate the pivoted arm from the ground.

Having now fully described my invention, what I claim as new, and desire to secure by Letters Patent, is—

1. In a straw-stacker, the combination, with the carrier D, of the pivoted frame or derrick C and swinging frame F, connected to the carrier and frame or derrick to enable them to be folded together when not in use or for transportation, substantially as set forth.

2. In a straw-stacker, the combination of the carrier D, provided at the feed end with hopper E, the pivoted frame or derrick C, and frame F, substantially as and for the purpose specified.

3. The combination, with the carrier D and pivoted frame or derrick C, of the swinging frame F, bail $g$, and rope $i$, substantially as and for the purpose described.

4. The pivoted frame or derrick C, the swinging frame F, and the carrier D, in combination with the pivoted arm G and segmental bar H, adapted to be engaged with or disengaged from each other to move and hold the pivoted frame or derrick in the desired position, substantially as and for the purpose set forth.

5. The pivoted frame or derrick C, carrier D, pulleys $n$ $q$, mounted on said derrick, and vertical rollers $r$, substantially as and for the purpose specified.

In testimony that I claim the above I have hereunto subscribed my name in the presence of two witnesses.

JONATHAN J. MOORE.

Witnesses:
E. H. BRADFORD,
H. J. ENNIS.